United States Patent
Fan et al.

(10) Patent No.: US 6,249,592 B1
(45) Date of Patent: Jun. 19, 2001

(54) MULTI-RESOLUTION NEUTRAL COLOR DETECTION

(75) Inventors: Zhigang Fan, Webster; Yeqing Zhang, Penfield; Martin E. Banton, Fairport, all of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/083,171

(22) Filed: May 22, 1998

(51) Int. Cl.$^7$ ....................................... G06K 9/00
(52) U.S. Cl. ......................... 382/112; 358/500; 382/260
(58) Field of Search ............................ 382/112, 162, 382/163, 164, 165, 173, 176, 180, 190, 199, 260, 266, 100, 169, 171, 175; 358/501, 538, 546, 453, 462, 500, 401, 429, 450, 455; 707/500, 515, 528, 529

(56) References Cited

U.S. PATENT DOCUMENTS

| | | | |
|---|---|---|---|
| 4,847,654 | * | 7/1989 | Honma et al. ............... 358/300 |
| 5,016,096 | * | 5/1991 | Matsunawa et al. ........ 358/538 |
| 5,132,786 | * | 7/1992 | Ishiwata .................... 358/500 |
| 5,282,026 | | 1/1994 | Nagata ....................... 358/500 |
| 5,287,204 | | 2/1994 | Koizumi et al. ............ 358/538 |
| 5,392,365 | * | 2/1995 | Steinkirchner ............. 382/260 |
| 5,528,386 | * | 6/1996 | Rolleston et al. .......... 358/522 |
| 5,542,052 | * | 7/1996 | Deutsch et al. ............ 395/131 |
| 5,574,802 | * | 11/1996 | Ozaki ........................ 382/176 |
| 5,615,312 | * | 3/1997 | Kohler ....................... 395/109 |
| 5,731,823 | * | 3/1998 | Miller et al. ................. 347/5 |
| 5,966,462 | * | 10/1999 | Linder et al. .............. 382/173 |
| 5,987,171 | * | 11/1999 | Wang ......................... 382/173 |
| 6,023,526 | * | 2/2000 | Kondo et al. .............. 382/165 |

* cited by examiner

Primary Examiner—Jay Patel
(74) Attorney, Agent, or Firm—Fay, Sharpe, Fagan, Minnich & McKee, LLP

(57) ABSTRACT

A method of neutral color detection for use in color copiers and scanners is provided. The method includes reading (10) an input page. The contents of the page are detected (12) and it is determined (14) if the page is neutral in color. If the page is not neutral in color (20), the page is then divided into a number of regions (30). Each region is then detected (40), and a determination (42) is made if individual regions are neutral in color. Next, details located outside regions determined to be neutral in color are detected (70) and it is determined (72) if the details are neutral in color. This multi-resolution technique permits the full page, an individual region, and/or particular details to be processed without the constraints, limitations, and reproduction demands associated with their color counterparts.

17 Claims, 5 Drawing Sheets

MULTI-RESOLUTION NEUTRAL COLOR DETECTION

BACKGROUND OF THE INVENTION

The present invention relates to the color detection arts. It finds particular application in conjunction with neutral color detection in color copiers and/or scanners, and will be described with particular reference thereto. However, it is to be appreciated that the present invention is also amenable to other like applications where color detection is desired.

In color image processing, reproduction, recording and the like, a page of image data is read and typically a three-color, cyan-magenta-yellow (CMY), system is employed for rendering. Optionally, a fourth color, black (K), is included. Generally, combinations of the colors CMY are applied in relative proportions to produce the color portions of the image. Additionally, the CMY colors can be applied to produce a resultant black. However, the resultant black achieved by combining the CMY colors is not as high quality as that achieved with the true black (K). Chromatic noise, misregistration, and the like can degrade the quality of black images generated by a CMY resultant black application. Moreover, multiple CMY passes are relatively more time consuming compared to a K pass, and they increase the depletion of CMY inks and/or toners. Generally, these and other inherent constraints, limitations, and/or reproduction demands associated with color processing and/or printing make it desirable to limit CMY utilization where possible.

In the past, there have been developed techniques for determining if input pages are neutral in color (i.e. black and white, or monochromatic) to thereby reduce CMY utilization where it was not necessary. For example, in U.S. Pat. Nos. 5,287,204 and 5,282,026, incorporated herein by reference, such techniques are disclosed. However, both references achieve limited results. That is to say, the references are directed to detecting at the page level and determining if an input page is neutral in color. Generally with these techniques, each page as a whole is classified as color or neutral, which results in either the whole page undergoing color processing or none of the page undergoing color processing. As such, these approaches fail to address, for example, chromatic noise in a neutral region of an otherwise color page. Moreover, no provisions are made for high quality neutral detail, such as text, that may be located in a color page or region thereof.

The present invention contemplates a new and improved multi-resolution neutral color detection method and system which overcomes the above-referenced problems and others.

SUMMARY OF THE INVENTION

In accordance with one aspect of the present invention, a method of neutral color detection for use in color copiers and scanners is provided. It includes reading an input page, detecting the page, and determining if the page is neutral in color. The page is then divided into a number of regions when the page is determined to be not neutral in color, each region is detected, and a determination is made if each region is neutral in color. Next, details outside regions determined to be neutral in color are detected, and it is determined if the details are neutral in color.

In accordance with a more limited aspect of the present invention, the page is detected by scanning a first averaging filter having a first block over the page, the regions are detected by scanning a second averaging filter having a second block over the regions, and the details are detected by scanning a third averaging filter having a third block over the details. The size of the third block is smaller than that of the first and second blocks.

In accordance with a more limited aspect of the present invention, the first block and the second block have sizes substantially the same.

In accordance with a more limited aspect of the present invention, during the detection of each region, averages obtained by the second averaging filter are ignored in determining if the region is neutral in color when the second block encompasses a boundary of the region.

In accordance with a more limited aspect of the present invention, during the detection of each region, averages obtained by the second averaging filter do not include pixels located outside the region when the second block encompasses a boundary of the region.

In accordance with a more limited aspect of the present invention, the detecting of the details and determining if the details are neutral in color further includes detecting edge pixels of the details. The third averaging filter is scanned over interior pixels of the details, and it is determined for each interior pixel if it is neutral in color based upon an average of pixels encompassed by the third block. For each edge pixel in turn, the third block is located such that the edge pixel is centered therein. A pixel having a relative intensity that is more extreme than an intensity of any other pixel located within the third block is chosen, and pixels located within the third block whose intensity varies by a degree greater than a predetermine threshold from the intensity of the chosen pixel are disregarded such that only a number of remaining pixels are left. It is determined that the edge pixel is not neutral in color when the number of remaining pixels that are not neutral in color is greater than a first predetermined number, and it is determined that the edge pixel is neutral in color when the number of remaining pixels that are neutral in color is greater than a second predetermined number. The determination is made that the edge pixel is unknown when a determination regarding the edge pixel has not otherwise been made.

In accordance with a more limited aspect of the present invention, edge pixels determined to be unknown are classified as not neutral in color.

In accordance with a more limited aspect of the present invention, edge pixels determined to be unknown are classified as one of not neutral in color when an immediate neighboring interior pixel determination is not neutral in color, and neutral in color when an immediate neighboring interior pixel determination is neutral in color.

In accordance with a more limited aspect of the present invention, the chosen pixel is a darkest pixel within the third block when the detail is dark on a light background, and the chosen pixel is a lightest pixel within the third block when the detail is light on a dark background.

A first advantage of the present invention is the high quality printing of gray image parts, and in particular black text.

Another advantage of the present invention is that ink/toner consumption and consequently ink/toner costs are reduced.

Another advantage of the present invention is that speed is increased by eliminating CMY printing passes where they are not otherwise appropriate.

Another advantage of the present invention is that its tunable thresholds permit a flexible approach adaptable to various applications.

Still further advantages and benefits of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

Figure 1:
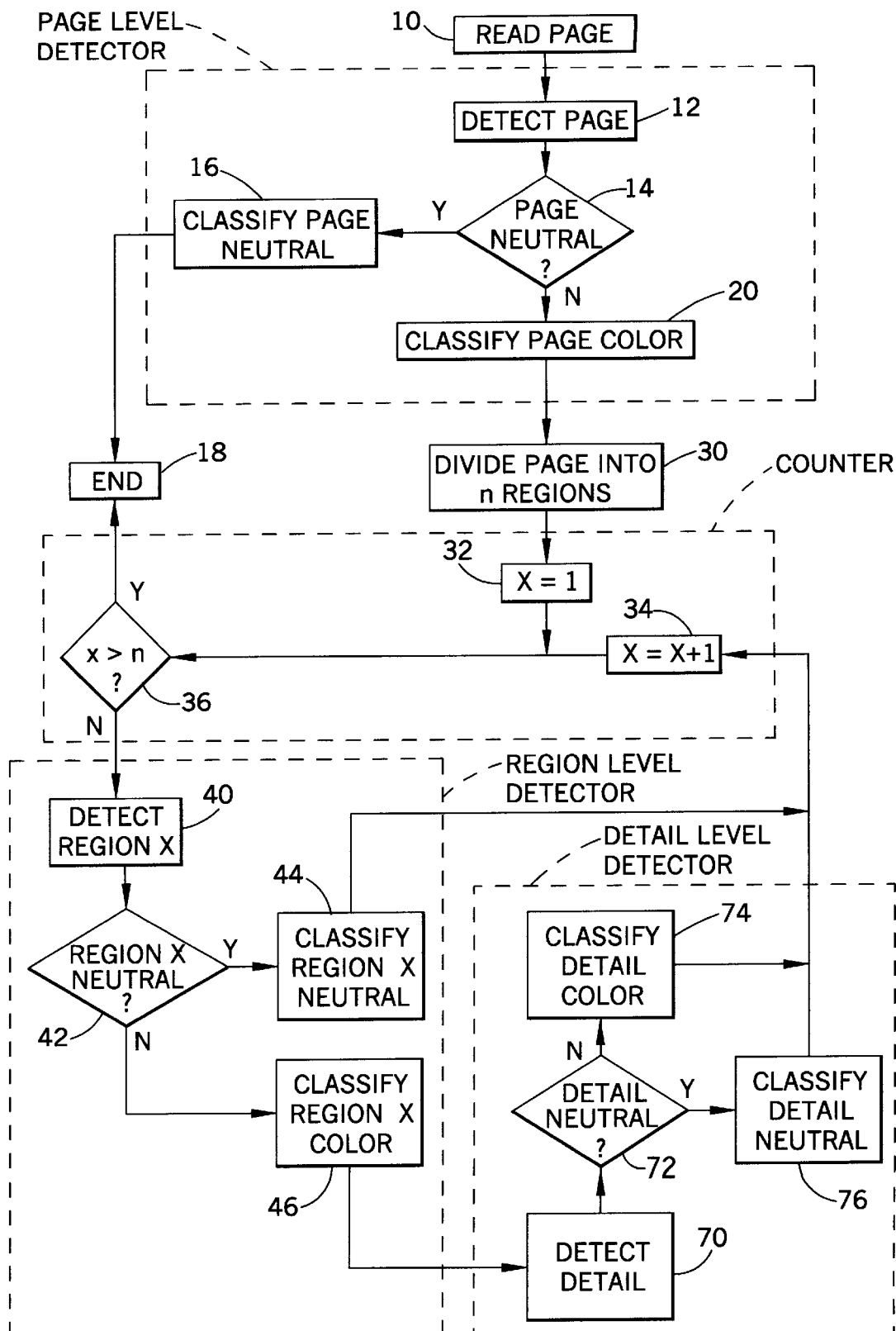
FIG. 1 is a diagrammatic illustration of the multi-resolution neutral color detection technique in accordance with aspects of the present invention.

With reference to FIG. 1, multi-resolution detection processing is depicted. An input page including images, graphics, text, and the like is opto-electrically read 10 by a color copier, scanner, or like apparatus. The page may be composed of color parts, neutral parts, or both. The contents of the page are initially detected 12 and a determination 14 is made either that the page contains no color parts (i.e. the page is neutral in color), or that the page contains color parts (i.e. the page is not neutral in color). If the determination is made that the page is neutral in color 16, the multi-resolution detection is complete 18 and the page may continue with processing as a black and white or monochromatic page. If the page is not neutral in color 20, it undergoes regional and detail level detection.

Figure 2:
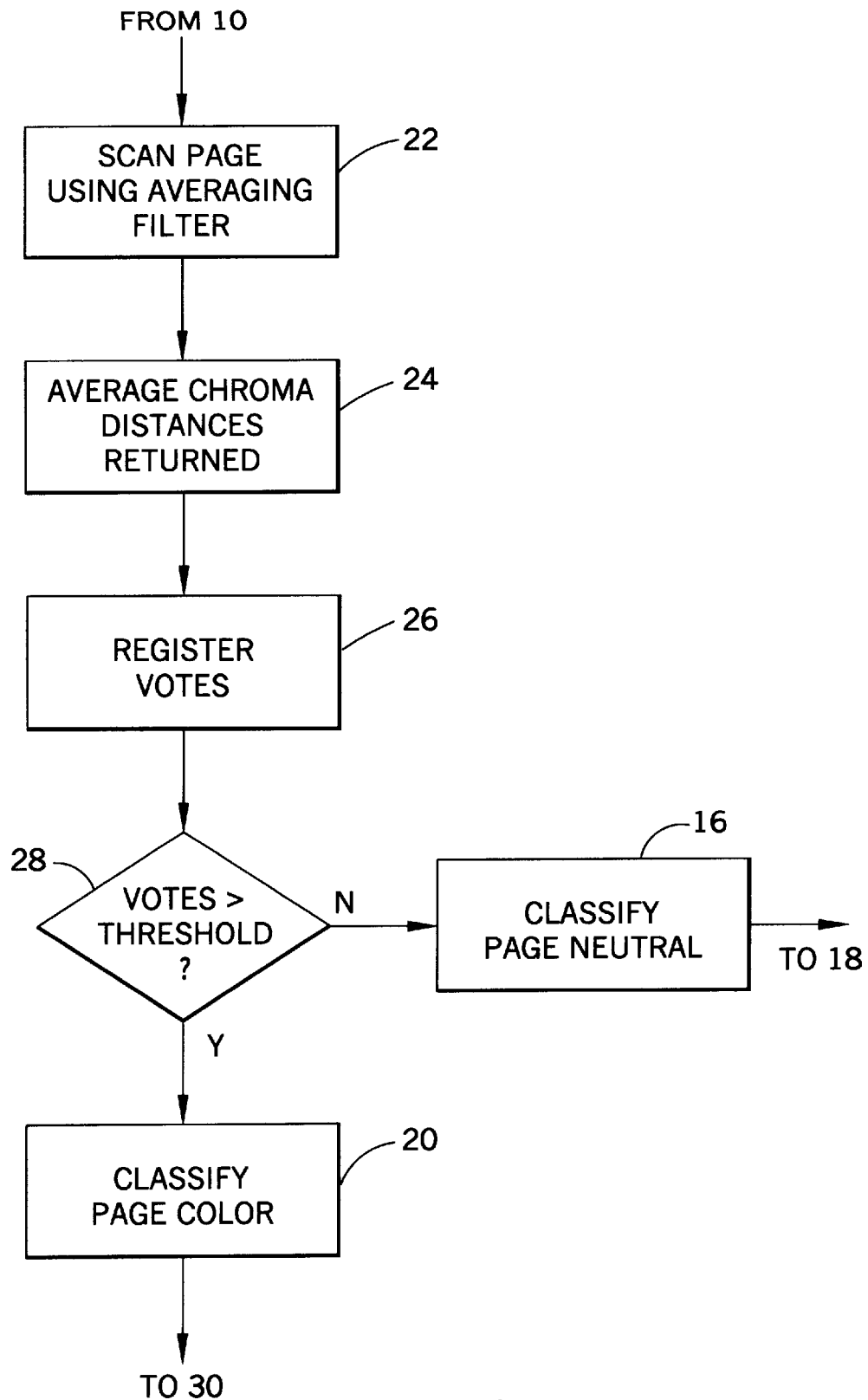
FIG. 2 is a diagrammatic illustration of the page level detection technique in accordance with aspects of the present invention.

More specifically, with reference to FIG. 2 and continuing reference to FIG. 1, the contents of the page are detected using an averaging filter having a large block or window which reduces chromatic noise. In operation, the block encompasses a number of pixels (the larger the block the more pixels encompassed) such that the averaging filter returns an average chroma distance of the encompassed pixels. In, for example an LAB color space, the chroma distance for each pixel is the distance of the pixel from the origin in he A,B plane. The averaging filter is scanned 22 across the input page and a number of average chroma distances are returned 24. For each returned average that has a sufficient chroma distance (i.e. that is colorful enough), a count or vote for not neutral in color is registered 26. Based on the number of counts/votes registered it is determined whether or not the page is neutral in color. That is to say, if the number of votes registered is greater than a set predetermined threshold 28 then the determination is made that the page is color 20, if not then the page is classified as neutral in color 16. In this manner, when the page is classified as neutral in color 16, it proceeds directly to printing or storage as a high quality gray-scale or black and white image.

In the case of printing, speed is increased in that CMY printing passes are eliminated and further color detection is not performed. Moreover, being that only black ink/toner is applied, chromatic noise in the output is eliminated and consumption of CMY inks/toners are reduced. In the case of storage, again chromatic noise in the output is eliminated being that only gray-scale or black and white data is retained. As well, the elimination of data regarding color or hue decreases processing time and reduces memory requirements. In short, the constraints, limitations, and/or reproduction demands associated with color processing and/or printing are not imposed on the page.

On the other hand, when the determination is made that a page is not neutral in color 20, regional level detection is implemented. Prior to the regional level detection, the input page is segmented into a number of regions 30, for example in the manner described in co-pending commonly assigned U.S. patent application No. 08/686,803 to Fan filed Jul. 26, 1996, entitled "Apparatus and Method for Segmenting and Classifying Image Data," incorporated by reference herein, and each region is separately classified as neutral or not neutral in color. In a preferred embodiment, a counter is initialized 32, and advanced 34 and queried 36 after a region is completed so that each of the regions are cycled through.

Figure 3A:
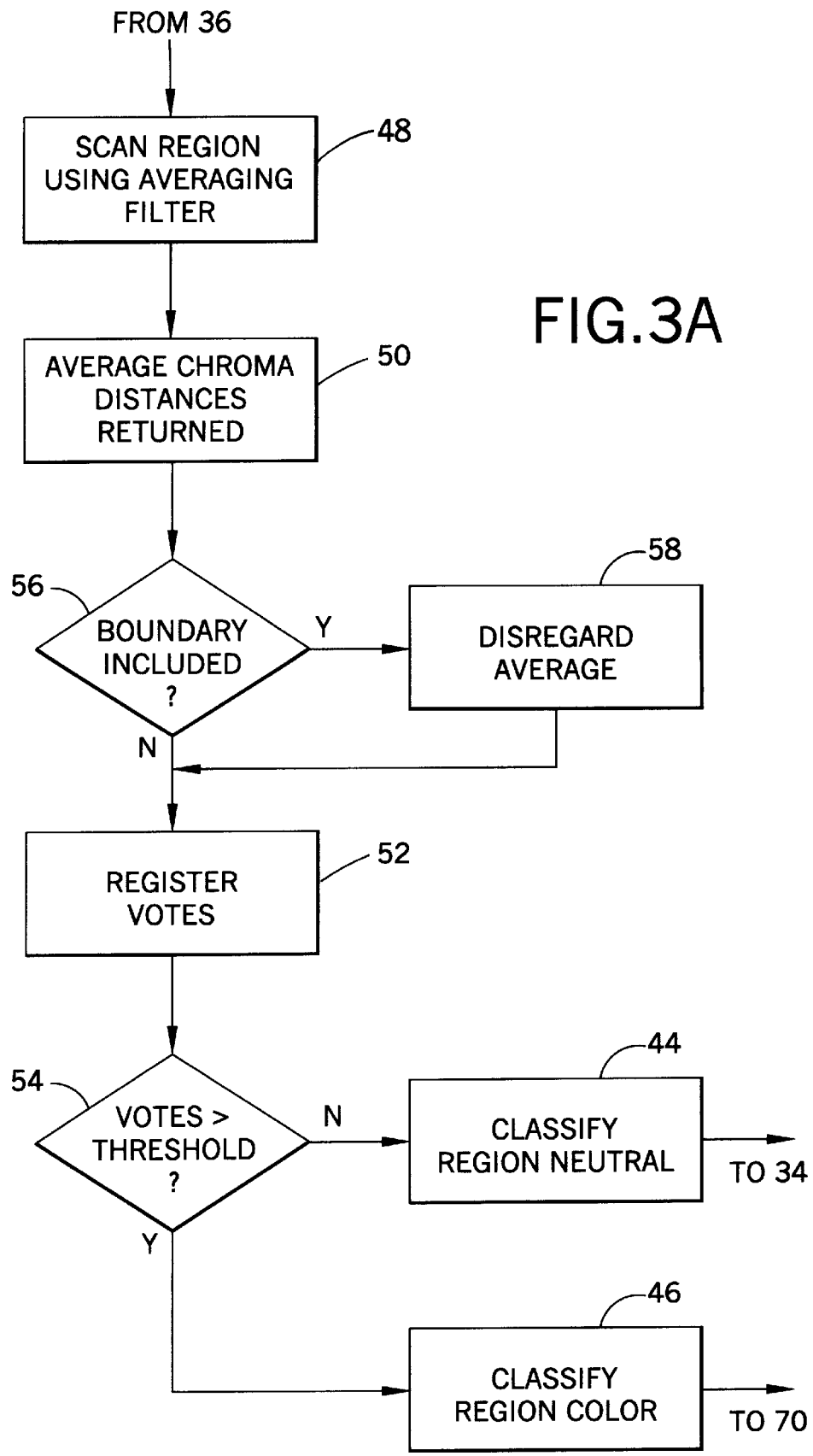
FIGS. 3A and 3B are diagrammatic illustrations of alternate regional level detection techniques in accordance with aspects of the present invention; and, FIG. 4 is a diagrammatic illustration of the detail level detection technique in accordance with aspects of the present invention.
Figure 3B:
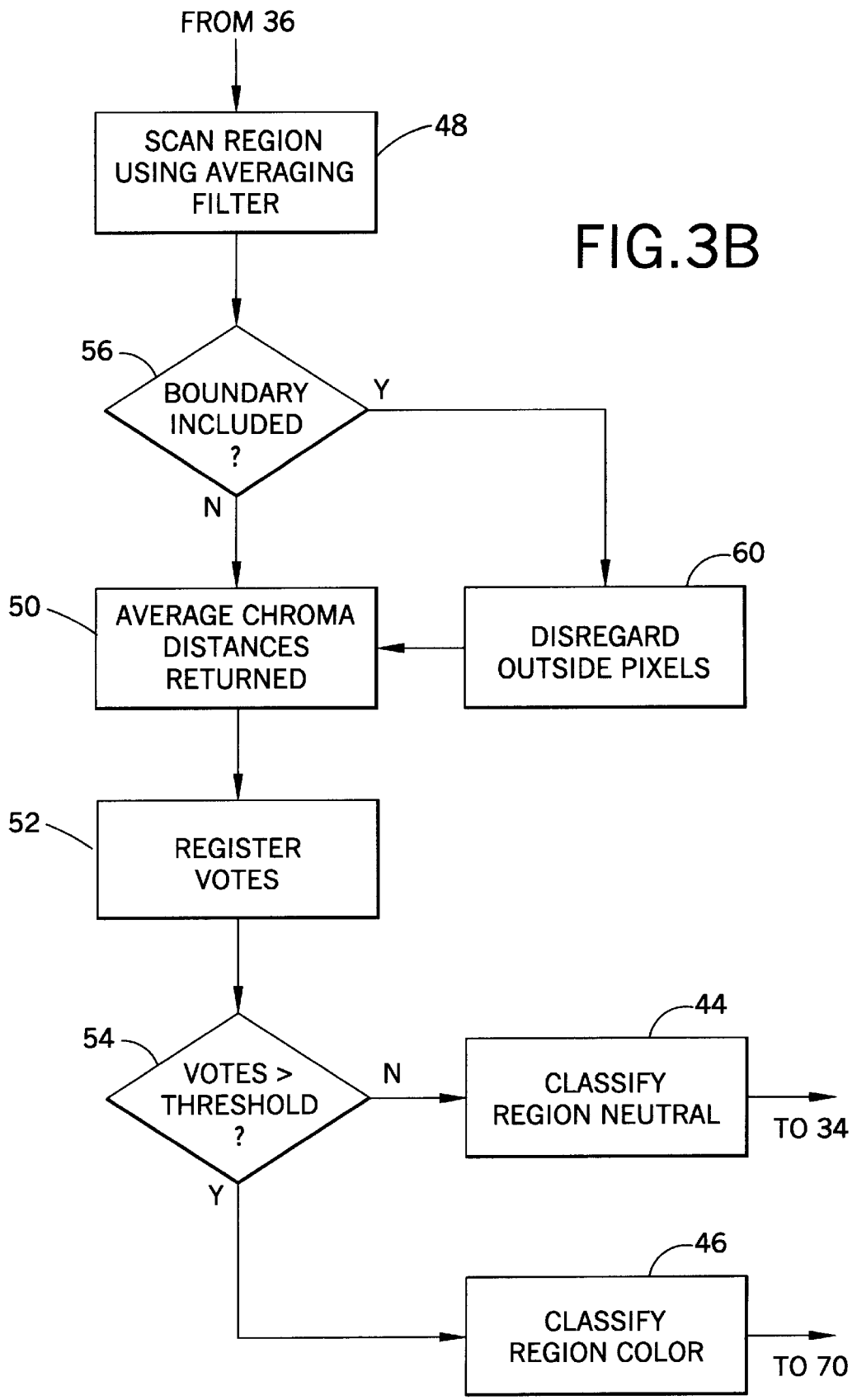

With reference to FIGS. 3A and 3B, and continuing reference to FIG. 1, the regional level detection 40 and determination 42 is similar to that of the page level detailed above. Each region is classified as neutral in color 44 or not neutral in color 46. In fact, in one preferred embodiment an averaging filter having substantially the same size block or window is employed. Alternately, the averaging filter of the regional level may have finer spatial resolution. Unlike the page level, the regions receive a different treatment at their boundaries.

In a preferred embodiment (see FIG. 3A), the boundary treatment involves disregarding, in the determination process, certain average chroma distances acquired. The averaging filter is scanned across each region 48 and a number of average chroma distances are returned 50 for each region. For each returned average in a region that has a sufficient chroma distance, a vote for not neutral in color is registered 52 for that region. Based on the number of votes registered in each region, it is determined whether or not that region is neutral in color. If the number of votes registered in a region is greater than a set predetermined threshold 54, then the determination is made that the region is color 46. If not, then the region is classified as neutral in color 44. However, when the averaging filter is positioned such that the block encompasses a boundary of a region 56 (i.e. pixels outside the region are being averaged with pixels inside the region), then the average returned is disregarded 58 in the determination process. It is treated as if no average was returned. In an alternate embodiment (see FIG. 3B), when the averaging filter is positioned such that the block encompasses a boundary of a region 56 the averages returned are not disregarded. Rather, those averages returned are only performed using the chroma distances of pixels inside the region 60. That is to say, as an alternative to disregarding the returned average altogether, the averaging filter is modified to only average the chroma distances of those pixels not outside the region. Ultimately, those origins classified as neutral in color are processed as high quality gray-scale or black and white regions without color processing.

In this manner, classification of certain regions as neutral in color results in improved speed, ink consumption, and quality for the same reasons detailed above with reference to the page level detection on a more limited scale. That is to say, for at least those regions of a color page that are determined to be neutral in color, the constraints, limitations, and reproduction demands associated with color processing and/or printing are not imposed. Moreover, the regional classifications permit the following described detail level detection to be confined to limited regions of the page thereby increasing efficiency.

Figure 4:
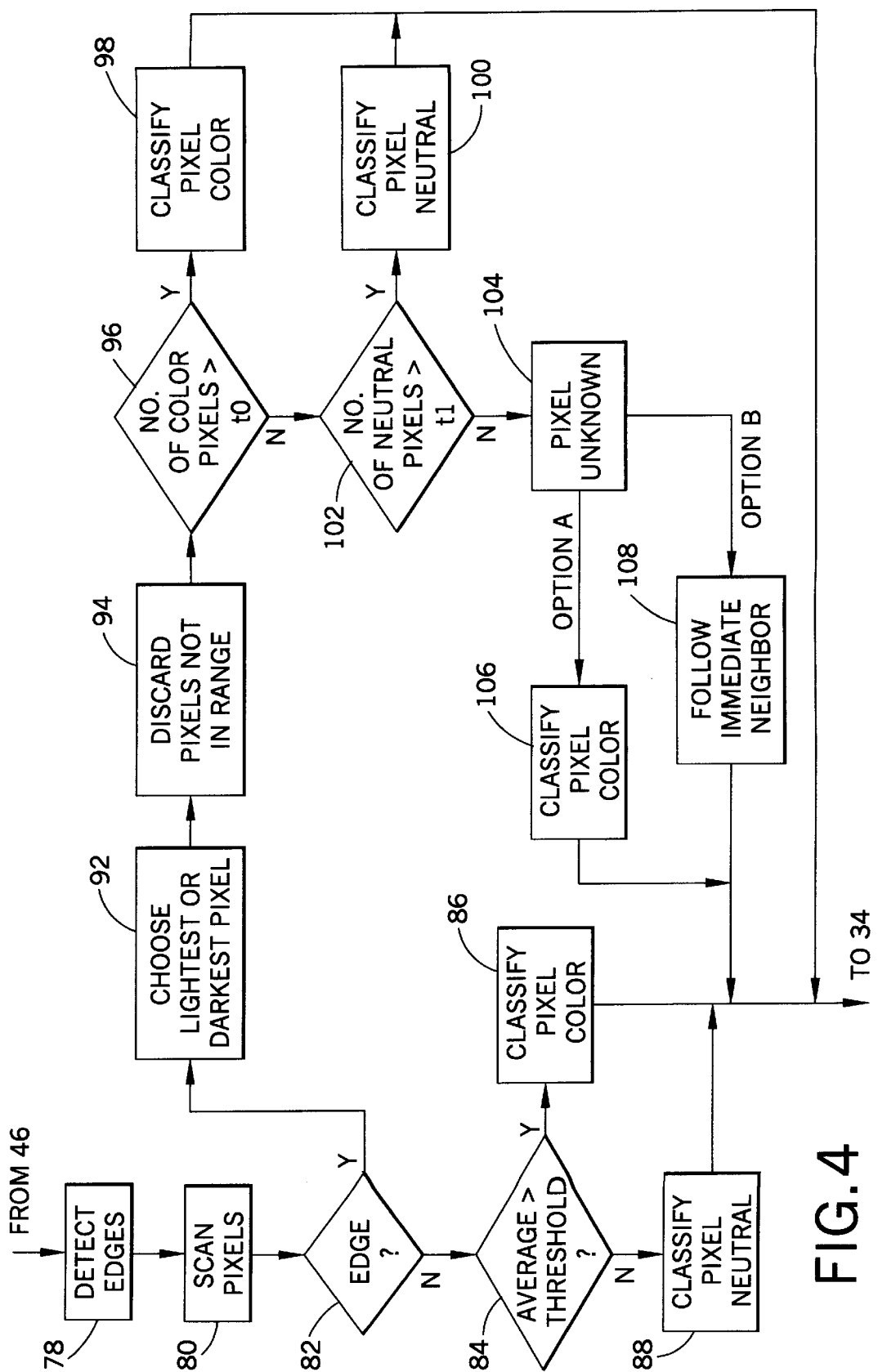

With reference to FIG. 4 and continuing reference to FIG. 1, after the regional level, a detail level detection is implemented to determine if details, such as text and the like, are neutral in color. The detail level detection is only implemented in those regions not already determined to be neutral in color. If a region is determined to be neutral in color 44 then details within that region would be neutral in color. Hence, it would be repetitive to detect details in that region. For detail level detection, details are detected 70, a determination is made 72, and the details are classified as color 74 or neutral 76.

The first step of the detail level detection is detecting the edge pixels of the details 78. The detection of the background and interior parts of the details is accomplished by averaging and thresholding. The pixels are scanned 80 with a high resolution averaging filter having a small block or window. The block size of the detail level filter is smaller than that for the page and/or regional level. A query 82 is made to establish if an edge is present. If not, the interior pixels are classified as neutral or not neutral in color on a pixel-by-pixel basis. The determination 84 for each is based upon an average chroma distance of pixels surrounding it. That is to say, a center pixel encompassed by the block is classified as not neutral 86 when the average chroma distance of the pixels within the block exceeds a predetermined threshold, and classified as neutral 88 when it does not.

Edge pixels are treated separately, as color values of these pixels may tend to provide unreliable information. For each edge pixel, a pixel having a relative intensity that is more extreme than an intensity of any other pixel located within the block is chosen 92. For regular detail or text (i.e. dark text on a light background), this is the darkest pixel, and for inverse detail or text (i.e. light text on a dark background), it is the brightest pixel. Pixels located within the block whose intensity varies by a degree greater than a predetermine amount from the intensity of the chosen pixel are discarded 94 from the determination process such that only a number of pixels remain. In this manner, edge pixels and background pixels are excluded from the decision.

In the determination process for the edge pixels, if the number of remaining pixels that are not neutral in color is greater than t0, a first predetermined number 96, it is determined that the edge pixel is not neutral in color 98. In a like manner, it is determined that the edge pixel is neutral in color 100 when the number of remaining pixels that are neutral in color is greater than a second predetermined number t1 102. Edge pixels are classified as unknown 104 when a determination regarding the edge pixel has not otherwise been made. This situation may arise where the number of color pixels does not exceed t0 and yet the number of neutral pixels does not exceed t1. The treatment of these edge pixels is handled in one of two manners.

In one preferred embodiment (option A), the edge pixels determined to be unknown are classified as not neutral in color 106, as generally it is safer to misclassify neutral in color rather than vice versa. Alternatively (option B), these edge pixels determined to be unknown are classified as not neutral in color when an immediate neighboring interior pixel determination is not neutral in color, or neutral in color when an immediate neighboring interior pixel determination is neutral in color. That is to say, the classification of the unknown edge pixel follows the last classification for an interior pixel determination 108.

In this manner, neutral color details, such as text and the like, in non-neutral color regions are ultimately processed as gray-scale or black and white images thereby achieving a higher quality. Again, as with the page and regional levels, text or details determined to be neutral in color are processed and/or printed free of the constraints, limitations, and reproduction demands associated with their color counterparts.

While the above described invention have been describe with reference to color copiers, scanner, and the like, the invention is amenable to neutral color detection in general. In at least one preferred embodiment, the various preset parameters, block or window sizes, levels, thresholds, predetermined numbers, and the like employed in the above described invention are tuneable to achieve a variety of desired goals consistent with any number of different applications.

The invention has been described with reference to the preferred embodiments. Obviously, modifications and alterations will occur to others upon a reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A method of neutral color detection for use in color image processing comprising the steps of:
   (a) reading an input page;
   (b) detecting contents of the page and determining if the page as a whole is substantially neutral in color;
   (c) dividing the page into a number of regions when the page as a whole is determined to be not substantially neutral in color, detecting each region, and determining if each region is substantially neutral in color overall; and,
   (d) detecting details outside regions determined to be substantially neutral in color overall and determining if the details are substantially neutral in color.

2. A method of neutral color detection comprising the steps of:
   (a) reading an input page;
   (b) detecting contents of the page and determining if the page is neutral in color;
   (c) dividing the page into a number of regions when the page is determined to be not neutral in color, detecting each region, and determining if each region is neutral in color; and,
   (d) detecting details outside regions determined to be neutral in color and determining if the details are neutral in color; wherein,
   the page is detected by scanning a first averaging filter having a first window over the page;
   the regions are detected by scanning a second averaging filter having a second window over the regions; and,
   the details are detected by scanning a third averaging filter having a third window over the details, wherein a size of the third window is smaller than that of the first and second windows.

3. The method of claim 2, wherein the first window and the second window have sizes substantially the same.

4. The method of claim 3, wherein during the detection of each region, averages obtained by the second averaging filter are ignored in determining if the region is neutral in color when the second window encompasses a boundary of the region.

5. The method of claim 3, wherein during the detection of each region averages obtained by the second averaging filter do not include pixels located outside the region when the second window encompasses a boundary of the region.

6. The method of claim 2, wherein the detecting of the details and determining if the details are neutral in color further includes:

detecting edge pixels of the details;

scanning the third averaging filter over interior pixels of the details;

determining for each interior pixel if it is neutral in color based upon an average of pixels encompassed by the third window; and, for each edge pixel;

locating the third window such that the edge pixel is centered therein;

choosing a pixel having a relative intensity that is more extreme than an intensity of any other pixel located within the third window;

discarding pixels located within the third window whose intensity varies by a degree greater than a predetermine threshold from the intensity of the chosen pixel such that a number of remaining pixels are left;

determining the edge pixel is not neutral in color when the number of remaining pixels that are not neutral in color is greater than a first predetermined number;

determining the edge pixel is neutral in color when the number of remaining pixels that are neutral in color is greater than a second predetermined number; and, determining the edge pixel is unknown when a determination regarding the edge pixel has not otherwise been made.

7. The method of claim 6, wherein edge pixels determined to be unknown are classified as not neutral in color.

8. The method of claim 6, wherein edge pixels determined to be unknown are classified as one of not neutral in color when an immediate neighboring interior pixel determination is not neutral in color, and neutral in color when an immediate neighboring interior pixel determination is neutral in color.

9. The method of claim 6, wherein the chosen pixel is a darkest pixel within the third window when the detail is dark on a light background, and the chosen pixel is a lightest pixel within the third window when the detail is light on a dark background.

10. A multi-resolution image processor comprising:

an input device which reads a page;

a page level detector which detects the contents of the page and determines if the page as a whole is substantially neutral in color;

a region level detector which divides the page into a number of regions, detects each region, and determines if each region is substantially neutral in color overall; and, a detail level detector which detects details of the page outside regions substantially neutral in color overall and determines if the details are substantially neutral in color.

11. A multi-resolution image processor comprising:

an input device which reads a page;

a page level detector which detects the contents of the page and determines if the page is neutral in color, wherein the page level detector includes a first filter with a first window that returns a representative chroma distance of pixels within the first window as the first filter is scanned across the page;

a region level detector which divides the page into a number of regions, detects each region, and determines if each region is neutral in color, wherein the region level detector includes a second filter with a second window that returns a representative chroma distance of pixels within the second window as the second filter is scanned across each region; and, a detail level detector which detects details of the page outside regions neutral in color and determines if the details are neutral in color, wherein the detail level detector includes a third filter with a third window that returns a representative chroma distance of pixels within the third window as the third filter is scanned across the details.

12. The multi-resolution image processor according to claim 11, wherein the regional level detector and the detail level detector only operate on the page when the page is not neutral in color.

13. The multi-resolution image processor according to claim 11, wherein a size of the third window is smaller then that of the first and second windows.

14. The multi-resolution image processor according to claim 13, wherein sizes of the first and second windows are substantially the same.

15. The multi-resolution image processor according to claim 11, wherein the page is processed as a gray-scale image when the page level detector determines the page is neutral in color.

16. The multi-resolution image processor according to claim 15, wherein each region of the page is processed as a gray-scale region when the region level detector determines the region is neutral in color.

17. The multi-resolution image processor according to claim 16, wherein details of the page are processed as gray-scale details when the detail level detector determines the details are neutral in color.

\* \* \* \* \*